(12) United States Patent
Paterson et al.

(10) Patent No.: US 10,530,562 B2
(45) Date of Patent: Jan. 7, 2020

(54) CORRELATING LOCAL TIME COUNTS OF FIRST AND SECOND INTEGRATED CIRCUITS

(71) Applicant: ARM Limited, Cambridge (GB)

(72) Inventors: Richard Andrew Paterson, Thurgoland (GB); Simon Crossley, Sheffield (GB); Ramnath Bommu Subbiah Swamy, Sheffield (GB); Steven Douglas Krueger, Austin, TX (US); Anitha Kona, Austin, TX (US)

(73) Assignee: ARM LIMITED, Cambridge (GB)

( * ) Notice: Subject to any disclaimer, the term of this patent is extended or adjusted under 35 U.S.C. 154(b) by 274 days.

(21) Appl. No.: 15/493,429

(22) Filed: Apr. 21, 2017

(65) Prior Publication Data

US 2018/0309565 A1    Oct. 25, 2018

(51) Int. Cl.
| | | |
|---|---|---|
| *G06F 1/12* | (2006.01) | |
| *H04L 12/26* | (2006.01) | |
| *H04L 7/00* | (2006.01) | |

(52) U.S. Cl.
CPC ........ *H04L 7/0033* (2013.01); *H04L 43/0858* (2013.01); *G06F 1/12* (2013.01)

(58) Field of Classification Search
None
See application file for complete search history.

(56) References Cited

U.S. PATENT DOCUMENTS

| | | | | |
|---|---|---|---|---|
| 2016/0170440 A1* | 6/2016 | Aweya | ...................... | G06F 1/12 713/503 |
| 2017/0168520 A1* | 6/2017 | Yu | .............................. | G06F 1/14 |
| 2018/0232006 A1* | 8/2018 | Ganfield | ................... | G06F 1/14 |

* cited by examiner

*Primary Examiner* — Danny Chan
(74) *Attorney, Agent, or Firm* — Nixon & Vanderhye PC

(57) ABSTRACT

A method for correlating first and second local time counts in first and second integrated circuits is provided. The first and second integrated circuits communicate via a communication network. A separate time control signal path is also provided between the integrated circuits. The method comprises determining a signal propagation latency associated with propagation of a latency determining signal between the integrated circuits on the time control signal path, and correlating the first and second local time counts in dependence on the signal propagation latency and a time correlating signal transmitted on the time control signal path.

20 Claims, 6 Drawing Sheets

CORRELATING LOCAL TIME COUNTS OF FIRST AND SECOND INTEGRATED CIRCUITS

BACKGROUND

Technical Field

The present technique relates to the field of data processing.

Technical Background

Data processing systems may maintain a time count which can be used for various purposes, such as scheduling tasks on a processing unit, tracking correlations between events, or managing coherent access to data for example. However, larger data processing systems may have two or more separate integrated circuits. Hence, it may be desirable for a common view of time to be maintained across different integrated circuits.

SUMMARY

Viewed from aspect, the present technique provides a method for correlating a first local time count of a first integrated circuit and a second local time count of a second integrated circuit, the first integrated circuit and the second integrated circuit configured to communicate via a communication network within a data processing apparatus; the method comprising:

determining a signal propagation latency associated with propagation of a latency determining signal between the first integrated circuit and the second integrated circuit on a time control signal path separate from the communication network; and correlating the first local time count and the second local time count in dependence on the signal propagation latency and at least one of a transmission time and a reception time of a time correlating signal transmitted between the first integrated circuit and the second integrated circuit on the time control signal path.

Viewed from another aspect, the present technique provides a data processing apparatus comprising:

a first integrated circuit to maintain a first local time count;

a second integrated circuit to maintain a second local time count;

a communication network to provide communication between the plurality of integrated circuits; and a time control signal path between the first integrated circuit and the second integrated circuit separate from the communication network;

wherein at least one of the first integrated circuit and the second integrated circuit comprises a time control agent to determine a signal propagation latency associated with propagation of a latency determining signal between the first integrated circuit and the second integrated circuit on the time control signal path, and to correlate the first local time count and the second local time count in dependence on the signal propagation latency and at least one of a transmission time and a reception time of a time correlating signal transmitted between the first integrated circuit and the second integrated circuit on the time control signal path.

Further aspects, features and advantages of the present technique will be apparent from the following description of examples, which is to be read in conjunction with the accompanying drawings.

DESCRIPTION OF EXAMPLES

Figure 1:
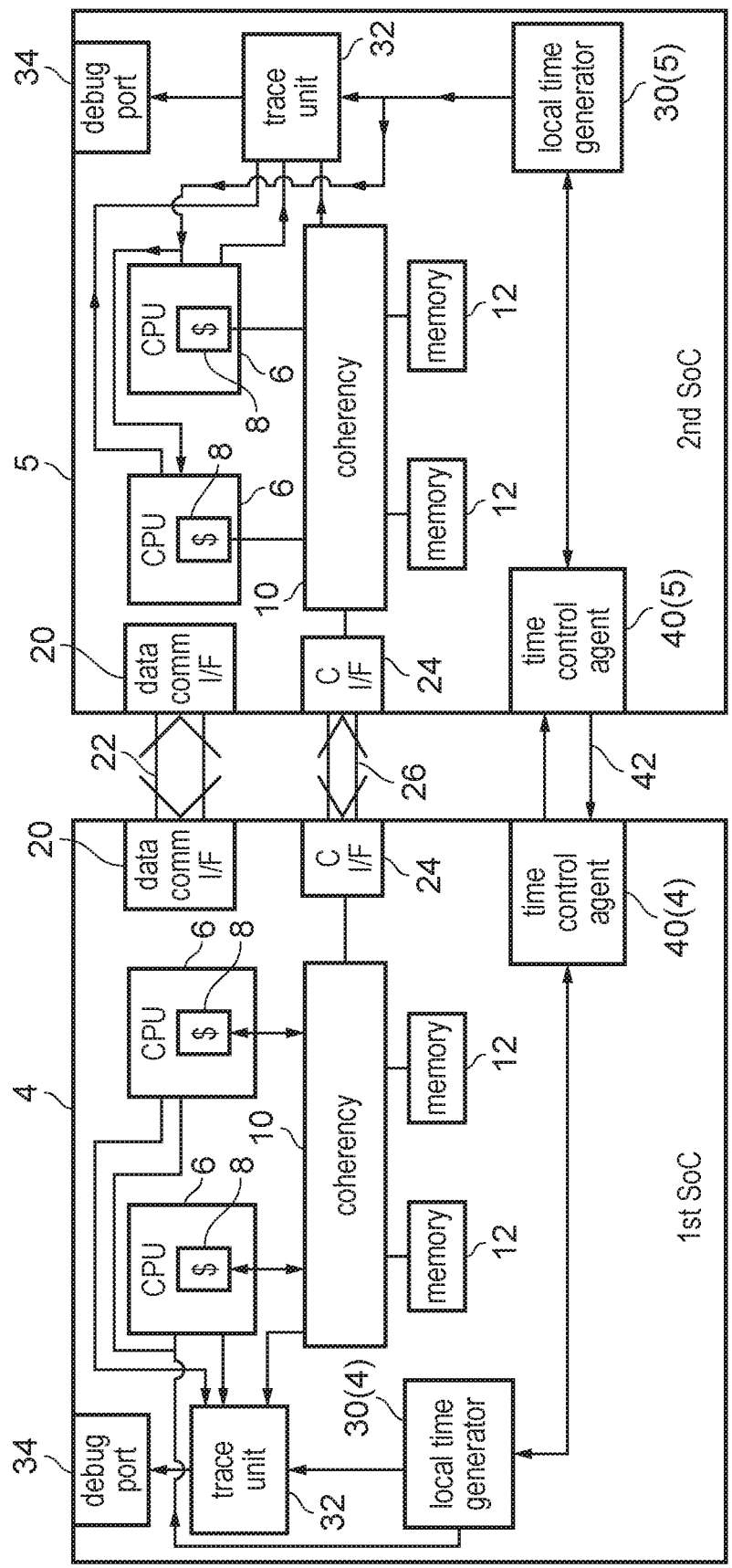
FIG. 1 schematically illustrates an example of a data processing apparatus comprising a first integrated circuit and a second integrated circuit.

Data processing system may include multiple processing units or other devices which may require a common view of time in order to function. For example, a local time count may be used task scheduling, measuring correlations between events for debugging purposes, or for managing coherency in accesses to data. When all of the devices requiring access to the common time count are on a single integrated circuit or system-on-chip (SoC), distributing a global view of time may be challenging but achievable, as the system design constraints are known once the integrated circuit design is complete. For example, signal propagation delays along certain paths can be characterised so that signal propagation delays associated with distributing the time count can be accounted for, enabling different components of the integrated circuit to see aligned local time counts.

However, increasingly data processing systems are becoming larger and so the data processing apparatus may include more than one integrated circuit, which nevertheless includes elements on different integrated circuits which may require a common view of time. Hence, there may be a desire to correlate a first local time count on a first integrated circuit with a second local time count on a second integrated circuit. This can be difficult since the latencies associated with communication between different integrated circuits would not be precisely known at design time, since they may depend on factors such as the particular way in which the integrated circuits have been connected together on a printed circuit board (e.g. the size of solder bumps coupling ports of the integrated circuit to communication paths, the distance separating the integrated circuits on the printed circuit board, and so on). Also, communication networks provided to communicate between integrated circuits may be used for general data transmissions, and so signal propagation delays on the network may be variable depending on the current bandwidth required for the data transmissions. Also, even if identical integrated circuits are brought out of reset at the same time, local time counters on each circuit may not start in a synchronised manner due to local timing variations caused by manufacturing process variation. Hence, it is typically difficult to maintain a common view of time across different integrated circuits.

The technique described in this application provides a time control signal path which is separate from the communication network used for communication between the first and second integrated circuits. A signal propagation latency associated with propagation of a latency determining signal between the first and second integrated circuits on the time control signal path is determined. First and second local time counts on the first and second integrated circuits respectively are correlated in dependence on the signal propagation latency and at least one of a transmission time and a reception time of a time correlating signal transmitted between the first and second integrated circuits on the time control signal path.

Hence, a dedicated time measuring signal path can be provided separate from the regular communication network, so that a deterministic latency associated with a signal passing on that path can be measured. A time correlating signal transmitted on that signal path can then be used to correlate the first and second local times. This enables correlation of the first and second local time counts in a more precise manner than is currently available. This can help to support larger data processing systems with multiple processor cores spread over several integrated circuits, while still supporting features such as debugging or task scheduling which may require a common view of time across the different integrated circuits.

The correlation between the first and second local time counts may be achieved in different ways. In some cases the correlating may comprise aligning the first and second local time counts, so that one (or both) of the first and second local time counts is adjusted to map to some common time value. This approach may use hardware circuits to adjust the local time count on one of the integrated circuits. This can make it simpler for software to use the local time counts, since there is no need for further adjustment in software—the software can be unaware of the alignment being performed in hardware.

The correlating may comprise storing or outputting an offset value which represents an offset between the first and second local time counts. In some implementations, the offset can be used by hardware to update one of the local time counts to bring it in line with the other local time count. For example, a time generating circuit may be provided on at least one of the first and second integrated circuits. The time generating circuit may generate the corresponding one of the first and second local time counts in dependence on the offset value.

In other examples, the offset may simply be stored or output for access by software. Hence, even if the first and second local time counts themselves are not adjusted in hardware, by generating an offset value to characterise the difference between the first and second local time counts, software can then take this into account when using the time counts (e.g. during task scheduling or debugging). For example, the software can add or subtract the offset value from one of the first and second local time counts to align it with the other local time count.

The signal propagation latency can be determined in different ways. In one example the signal propagation latency may be determined in dependence on a round trip time of the latency determining signal and a response to the latency determining signal transmitted between the first and second integrated circuits. For example, one of the first and second integrated circuits may transmit the latency determining signal to the other, and the other integrated circuit may then respond as soon as it receives the latency determining signal. If the propagation latencies associated with the latency determining signal and the response are assumed to be approximately equal, then the signal propagation latency can be determined as half the round trip time. Alternatively, in some implementations, the receiving integrated circuit could wait for a certain constant delay period D between reception of the latency determining signal and transmission of the response, and in this case the signal propagation latency may correspond to $\frac{1}{2}*(RTT-D)$, where RTT is the round trip. Using a delay period D allows the time control signal path to be implemented as a single bidirectional channel shared between transmission and reception in both directions between the first and second integrated circuits, rather than two unidirectional wires dedicated to transmission in opposite directions between the first and second integrated circuits.

Alternatively, it may not be necessary to actually transmit a signal on the time control signal path at the time of correlating the first and second time counts. Instead, the signal propagation latency may have been determined previously by transmitting a latency determining signal on the time control signal path, with the signal propagation latency stored to a storage element which is accessible to at least one of the first and second integrated circuits. Hence, at the time of correlating the first and second local time counts, the signal propagation latency may be determined by reading the signal propagation latency from a storage element.

As discussed above, the correlation of the first and second type local time count can be performed in different ways. The examples below assume that the time correlating signal is transmitted from the first integrated circuit to the second integrated circuit (although it will be appreciated that the labels "first" and "second" are arbitrary and so could be mapped either way to a pair of integrated circuits). Hence, the first integrated circuit is the integrated circuit which initiates the time correlating signal and the second integrated circuit is the one that receives it.

In one example the correlating may comprise recording a value T1 of the first local time count when the time correlating signal is transmitted at the first integrated circuit, recording a value T2 of the second local time count when the time correlating signal is received at the second integrated circuit, and determining an offset value for correlating the first local time count and the second local time count in dependence on T1, T2 and the signal propagation latency TL. Hence, the correlation is dependent on the transmission time T1 and reception time T2 of the time correlating signal as measured using the first and second local time counts respectively and the signal propagation latency TL determined previously. For example, the offset value may comprise a value corresponding to a difference between T1 and (T2−TL). Note that this difference could be calculated in different ways, e.g. as T1−(T2−TL) or as T1+TL−T2. As discussed above, the offset value could simply be output or stored for access by software which can use it to correlate the timings on the different integrated circuits, or alternatively the offset value may be used to adjust one of the first and second local time counts in hardware. For example, at least one of the integrated circuits may include a local time generating circuit which updates a previous offset being applied to the corresponding local time count based on the newly correlated offset value. While the adjustment could be applied to either the first or the second local time count, it may be desirable to ensure that no adjustment to a local time count can result in time going backwards, because running time backwards could result in a non-unique view of time (where two separate moments in time correspond to the same count value), which could be problematic for scheduling of events or debugging purposes. Time running backwards can be avoided by applying the adjustment using the correlated offset value to the one of the first and second local time counts that have the lowest time count value. Hence, the lower of the first and second time count values is updated to move forward in time to match the other of the local time counts, or alternatively both local time counts could be updated to some future value.

Another approach for correlating the first and second local time counts may be to transmit the time correlating signal from the first integrated circuit to the second integrated circuit when the first local time count reaches a predetermined count value which corresponds to a difference between a future count value and the signal propagation latency, and then to set the second local time count to the future count value in response to receipt of the time correlating signal at the second integrated circuit.

Hence, rather than measuring reception and arrival times of the time correlating signal and calculating an offset based on the difference, with the second approach the first integrated circuit determines a future instant of time which is to be set to the second local time count and transmits the time correlating signal at a transmission timing selected such that by the time the time correlating signal reaches the second integrated circuit, the first local time count will be at the future count value. Hence, when the second integrated circuit responds to receipt of the time correlating signal by setting the second local time count to the future count value, this results in correlation of the first and second local time counts. This approach can be particularly useful in cases where one integrated circuit acts as the primary integrated circuit which controls time generation across the entire system, and the other integrated circuits act as secondary integrated circuits which take their view of time from the primary integrated circuit. For example, this approach can be useful in systems where integrated circuits can be placed in a power saving state when not needed, to vary the number of active integrated circuits depending on the processing workload required. For example, the primary circuit may be always powered, but depending on current workloads may allocate tasks to other integrated circuits, with variable numbers of secondary integrated circuits powered up as required. Hence, at the time of powering up one of the secondary integrated circuits, the primary integrated circuit may push its view of time to the secondary integrated circuit to start processing on the secondary integrated circuit with a view of time aligned to the primary integrated circuit.

In some implementations the first integrated circuit may transmit an indication of the future count value to the second integrated circuit before transmitting the time correlating signal. The transmitted indication may be any information which enables the future count value to be determined by the second integrated circuit (the future count value does not have to be explicitly indicated). In some cases, there may be a risk that the future count value takes a long time to reach the second integrated circuit. For example, the time control signal path used to transmit the time correlating signal may be a relatively simple interface which is not capable of transmitting binary values with multiple bits that may be necessary to represent the future count value. Hence, the future count value may be transmitted using the regular communications network and if the current load conditions on the communications network are high then the future count value may take longer to reach the second integrated circuit. If the time correlating signal is received before the second integrated circuit has received the future count value, this could lead to incorrect setting of the second local time count. This issue can be addressed in different ways.

In one example, the second integrated circuit may acknowledge receipt of the future time count value. If the first local count value is detected by the first integrated circuit as reaching the predetermined count value before the second integrated circuit has acknowledged receipt of the future time count value, then the first integrated circuit may restart the correlating process. For example, the restarting may comprise determining another future count value and transmitting it again. The first integrated circuit may then proceed to transmit the time correlating signal on an attempt when the second integrated circuit does acknowledge receipt of the future time count value before the first local count value reaches the predetermined count value. This approach places the burden on determining whether the correlating has been successful on the first integrated circuit.

Alternatively, the responsibility could be placed on the second integrated circuit to request a restart of the correlating process if the time correlating signal is received by the second integrated circuit before the future time count value has been received by the second integrated circuit. This second approach avoids the need for an acknowledgement to be sent by the second integrated circuit, saving some bandwidth on the communications network for example.

Alternatively, other techniques may not require the first integrated circuit to transmit an indication of the future count value at all. For example, if the correlating is triggered by some predetermined event such as a reset operation then the future count value could simply be a count value which is a fixed number of cycles after the timing of the reset event and in this case the first and second integrated circuits may effectively be hardwired to agree on some particular value for the future count value. This approach may be sufficient in systems where the correlation is typically only performed following certain events such a reset. However, the approach discussed above where the future count value is transmitted from the first to the second integrated circuit can be more flexible in permitting correlations at more arbitrarily defined timings.

In the approach where the correlation is performed based on controlling the transmission timing of the time correlating signal in dependence on the signal propagation latency, the correlation could be performed after a reset or power up event for the second integrated circuit, in which case the second local time count value may not yet have been initialised at the time the correlation is performed. In this case, it may be sufficient to update the second local time count to match the future time count.

However, if the correlation is performed subsequently at a time when the second integrated circuit is already counting time using its second local time count, then there is a possibility that the second local time count may already be ahead of the future time count value chosen by the first integrated circuit. As mentioned above, it can be undesirable for time to be seen to run backwards. Therefore, in some embodiments, the second integrated circuit may determine whether the future count value is less than a reception time of the time correlating signal as measured using the second local time count. When the future count value is greater than or equal to the reception time, the second integrated circuit may align its second local time count with the first local time count by setting the second local time count to the future count value. However, when the future count value is less than the reception time, the second integrated circuit may align the second local time count with the first local time count by pausing the second local time count for a number of cycles corresponding to the difference between the reception time and the future count value. In this way, by the time the second local time count is restarted after the pause, the first local time count value will have caught up with the second local time count, to align the first and second local time counts.

Regardless of which of the options discussed above is used for correlating the first and second local time counts, the technique can be applied to any data processing system having multiple integrated circuits which maintain separate local time counts. However, it can be particularly useful in a case where at least one of the first integrated circuit and the second integrated circuit comprises coherency managing circuitry to manage coherency between data accessed by the first integrated circuit and data accessed by the second integrated circuit. Some coherency protocols may rely on the local time stamps providing a common view of time. To allow such coherency schemes to span the first and second integrated circuits, this may require correlation of the local time stamps maintained by each integrated circuit.

Also, the technique discussed above can be particularly useful where at least one of the first and second integrated circuits includes debug circuitry for capturing or outputting information tracking timings of events occurring in the first integrated circuit or the second integrated circuit (in particular if both integrated circuits have their own debug circuitry). Without correlating the first and second local time stamps it may be difficult for a debugger to determine whether an event occurring in the first integrated circuit occurred before or after an event occurring in the second integrated circuit. By enabling the first and second local time stamps to be correlated (and optionally aligned) this can simplify debugging of systems spanning multiple integrated circuits.

The above examples discuss a first integrated circuit and a second integrated circuit, but the technique can also be applied to systems including three or more integrated circuits. In this case, the first and second integrated circuits discussed above may be any two of the three or more integrated circuits. The three or more integrated circuits may be connected by respective time control signal paths in a topology having the property that any two of the integrated circuits are connected either directly by one of the time control signal paths or indirectly by control signal paths passing via at least one other integrated circuit. Hence, it is not necessary to connect every single pair of integrated circuits via a dedicated time control signal path, instead it is enough that it is possible to align or correlate the time stamps on any two integrated circuits directly or indirectly via correlations with other circuits. The three or more integrated circuits could be connected in a number of different topologies, such as a ring topology, line topology, tree topology or star topology, for example.

The time control signal path may comprise a bidirectional communication path with a deterministic propagation delay. Unlike a bus network where a requesting master may need to request access to the bus and the time taken to gain access to the bus may depend on what other data transmissions are currently pending or on relative priority between different masters asserting signals on the bus, with the time control signal path the signal propagation delay may be deterministic so that the time between requesting a transmission and the other integrated circuit receiving the transmission may be relatively repeatable between transmissions.

In some examples, the bidirectional communication paths may comprise a pair of wired signal paths which pass along corresponding routes between the first and second integrated circuit. Hence, one of the signal paths may be used for signals transmitted by the first integrated circuit to the second integrated circuit and the other signal path may be used by signals translated from the second integrated circuit to the first integrated circuit. This can simplify characterisation of the signal propagation delay since it is relatively straightforward to provide hardware on one of the first integrated circuits for mirroring a received signal to generate a transmitting signal on the other of the pair of wired signal paths.

However, it is also possible for the time control signal path to comprise a single bidirectional wire so that at any given time either the first integrated circuit may be transmitting signals to the second integrated circuit or the second integrated circuit may be transmitting signals to the first integrated circuit, but not both at the same time. By providing for a predetermined delay period between transmission and reception, a protocol can be used to measure the signal propagation delay on the time control signal path even if it is not possible for both integrated circuits to be simultaneously transmitting and receiving. An example is shown in FIG. 4B below.

The time control signal path could also comprise a wireless signal path. For example, integrated circuits may communicate via transmission of radio signals within the data processing system or by transmission of pulses of light. The communication network used for high level data communication between the integrated circuits could also use wireless communication.

Another approach may be that the respective integrated circuits correspond to different layers within a three dimensional integrated circuit. The time control signal path could include through vias which pass vertically between different layers of the three dimensional structure through the substrate of at least one layer.

The first and second integrated circuits may comprise any separate integrated circuits assembled into a data processing system. For example, each integrated circuit may correspond to a set of components formed on a single piece of silicon or other semiconductor. Each integrated circuit may be such that the propagation delays of associated with a given integrated circuit may be characterised at design time (subject to natural variation caused by manufacturing process variation), while the signal propagation delays between different integrated circuits cannot be characterised a design time. The respective integrated circuits may be mounted on a common printed circuit board and connected to the circuit board via solder bumps, conductors etc.

FIG. 1 schematically illustrates an example of a data processing system 2 comprising a first system on chip (SoC) 4 and a second SoC 5. The first SoC 4 comprises a number of central processing units (CPUs) 6 each of which has at least one local cache 8. Coherency between the data in the respective CPU's caches 8 is managed by a coherent interconnect 10, which may be responsible for tracking accesses to the caches 8 and memory 12 from the respective CPUs 6 and snooping the cache 8 in another CPU 6 if required to maintain coherency. It will be appreciated that the CPUs 6 are just one example of possible master devices between which coherency can be managed, and other SoCs may include other types of master such as graphics processing units (GPUs), display controllers, peripheral controllers or other input/output controlling devices, and so on.

The first SoC 4 has a data communications interface 20 for communicating with the second SoC 5 via a communications network 22. Also, a coherency interface 24 is provided for communicating with a corresponding coherency interface of the second SoC 5 via a coherency signal path 26, so that a coherent view of data accessed by both SoCs 4, 5 can be maintained. For example, snoop transactions and snoop responses could be transmitted over the coherency signal path 26. While this example has separate communication paths for data communications and coherency messages, other examples could share the same path for both data and coherency communications, so that the data communications interface 20 and the coherency interface 24 could be a single component. The first SoC 4 includes a local time generator 30(4) for generating a first local time count which provides a view of time which is common across the first SoC 4. Time stamps generated by the local time generator 30(4) can be routed to various components of the first SoC 4, such as the coherency circuitry 10, the CPUs 6, and trace unit 32 (debug module) for monitoring events occurring within the first SoC 4 and generating a stream of trace packets output to an external debugger via a debug port 34. For example, the trace packets may be timestamped with a value of the first local time count generated by the local time generator 30(4), and may provide information on events occurring within the SoC 4, such as the addresses of executed instructions, addresses of data accesses, occurrence of exceptions, faults, cache misses, branch mispredictions or other events. While not shown in FIG. 1, known techniques may be applied to ensure that the time counts arriving at a given component of the SoC 4 are adjusted to account for propagation delays in routing the time count from the local time count generator 30(4).

The second SoC 5 includes the same components as the first SoC 4 in this example, so are not described again for conciseness. However, it will be appreciated that this is not essential, and in many cases the components of the two SoCs 4, 5 may differ. In general, the provision of multiple SoCs within the same data processing system 2 enables larger more powerful processing systems to be provided with a greater number of processor cores 6 whilst still enabling coherency to be maintained across the different SoCs so that the system as a whole behaves as a single larger processor cluster even though it is distributed across multiple integrated circuits 4,5.

However, when multiple integrated circuits 4, 5 need to agree on a common view of time, for example to correlate the events tracked by the trace units 32 on the respective SoCs 4, 5 or to schedule tasks across the processors 6 in the two SoCs 4, 5, this can create challenges in managing a common time count. While the first and second local time counts generated by each local time generator 30(4), 30(5) may be distributed within a SoC to provide a common view of time across the SoC, because the design constraints associated with each SoC may be known at design time, the communication delays between the SoCs on the data communications network 22 cannot be determined at design time, because they depend on current bus utilisation as well as on the particular way in which the integrated circuits have been connected together. Hence, the techniques used within a SoC to align time counts seen by different components cannot be applied to components in different SoCs.

Figure 2:
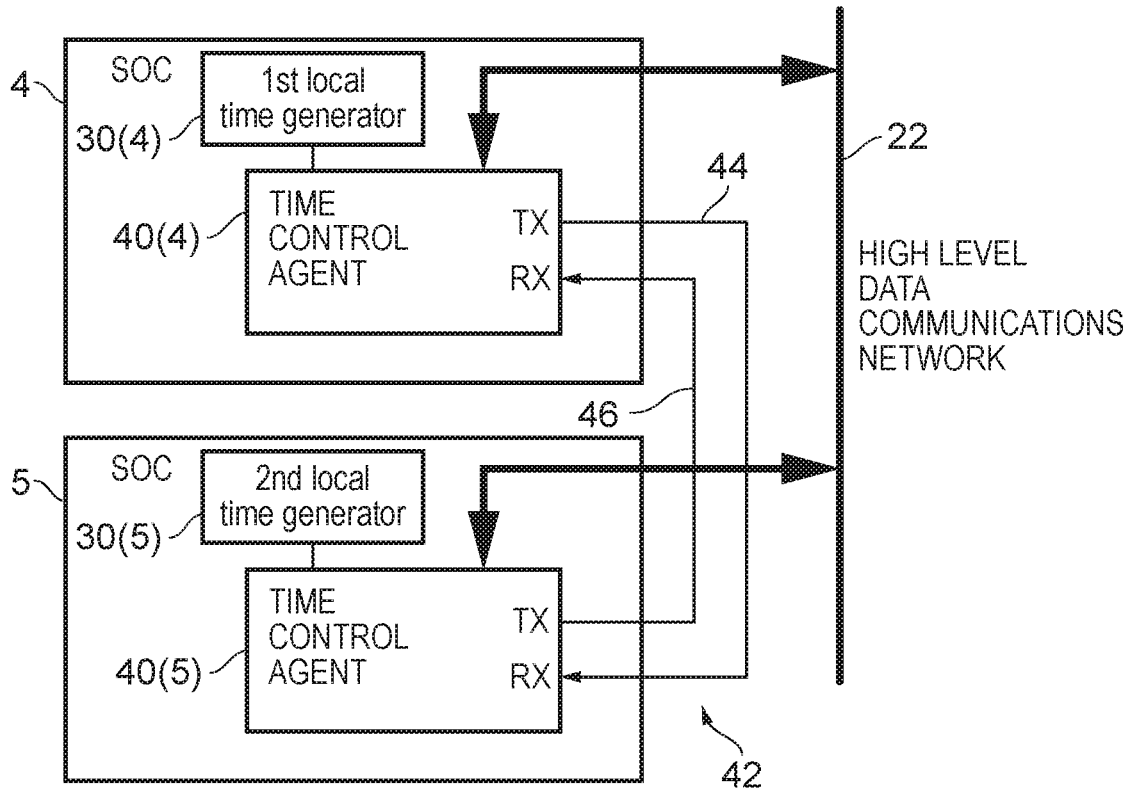
FIG. 2 shows an example of time control agents correlating first and second local time counts based on signals provided over a time control signal path which is separate from a communications network.

A time control agent 40 is provided on each of the respective SoCs 4, 5. The time control agents 40(4), 40(5) communicate with each another via a time control signal path 42. Although not shown in FIG. 1 for conciseness, the time control agents 40 may also be able to communicate data via the data communications network 22. The time control signal path 42 is a separate communications channel from the data communications network 22. The time control signal path 42 provides a bidirectional channel with deterministic latency of signals propagating on the channel. For example, as shown in FIG. 2, the time control signal path 42 may comprise a pair of wires routed between the respective time control agents 40 along corresponding routes on the printed circuit board on which the respective SoCs have been mounted. One wire 44 is used for transmission of signals from the first SoC's time control agent 40(4) to the second SoC's time control agent 40(5). The other wire 46 is used for transmission of signals from the second SoC's time control agent 40(5) to the first SoC's time control agent (4). In other examples the wires 44, 46, could be replaced with a single bi-directional wire used for transmission and reception of signals in both directions. Also, in some examples the time control signal path 42 and the high level data communications network 22 could be wireless communication channels (e.g. using radio, infrared or visible light transmission) rather than wired paths.

Figure 3:
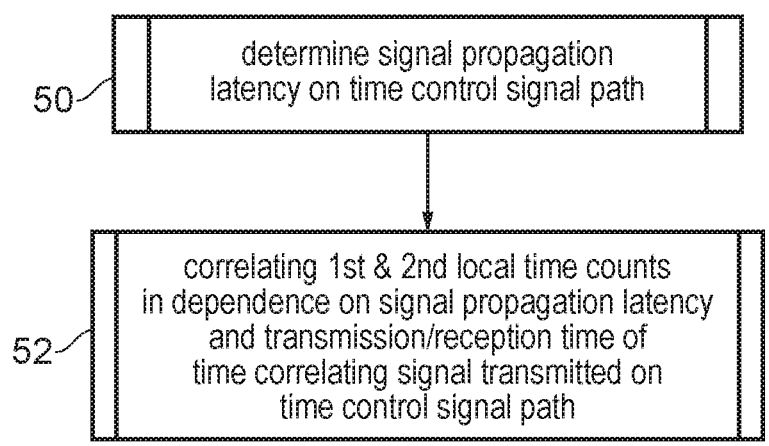
FIG. 3 is a flow diagram showing a method of correlating a first local time count and a second local time count.

FIG. 3 shows a method of correlating the first and second local time counts on the respective SoCs. 4, 5. At step 50 the time control agent 40 of one the SoCs, 4, 5 determines a signal propagation latency on the time control signal path 42. At step 52 the time control agent correlates the first and second local time counts in dependence on the signal propagation latency determined at step 50 and at least one of a transmission and reception time of a time correlating signal transmitted on the time control signal path 42. The dependence of step 52 on the transmission or reception time of the time correlating signal could be because an offset value is calculated based on a transmission or reception time of the time correlating signal measured using the first or second local time counts, or because the time at which the time correlating signal is transmitted may be controlled based on the signal propagation latency. Examples of different correlation techniques are discussed below.

Figure 4A:
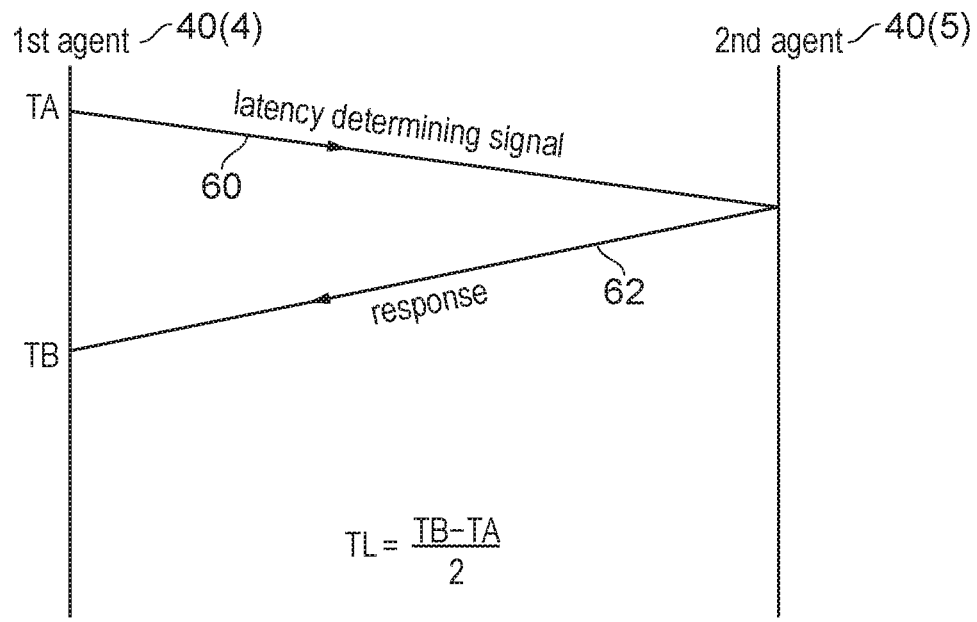
FIG. 4A shows a first example of determining a signal propagation latency associated with a signal propagated on the time control signal path.
Figure 4B:
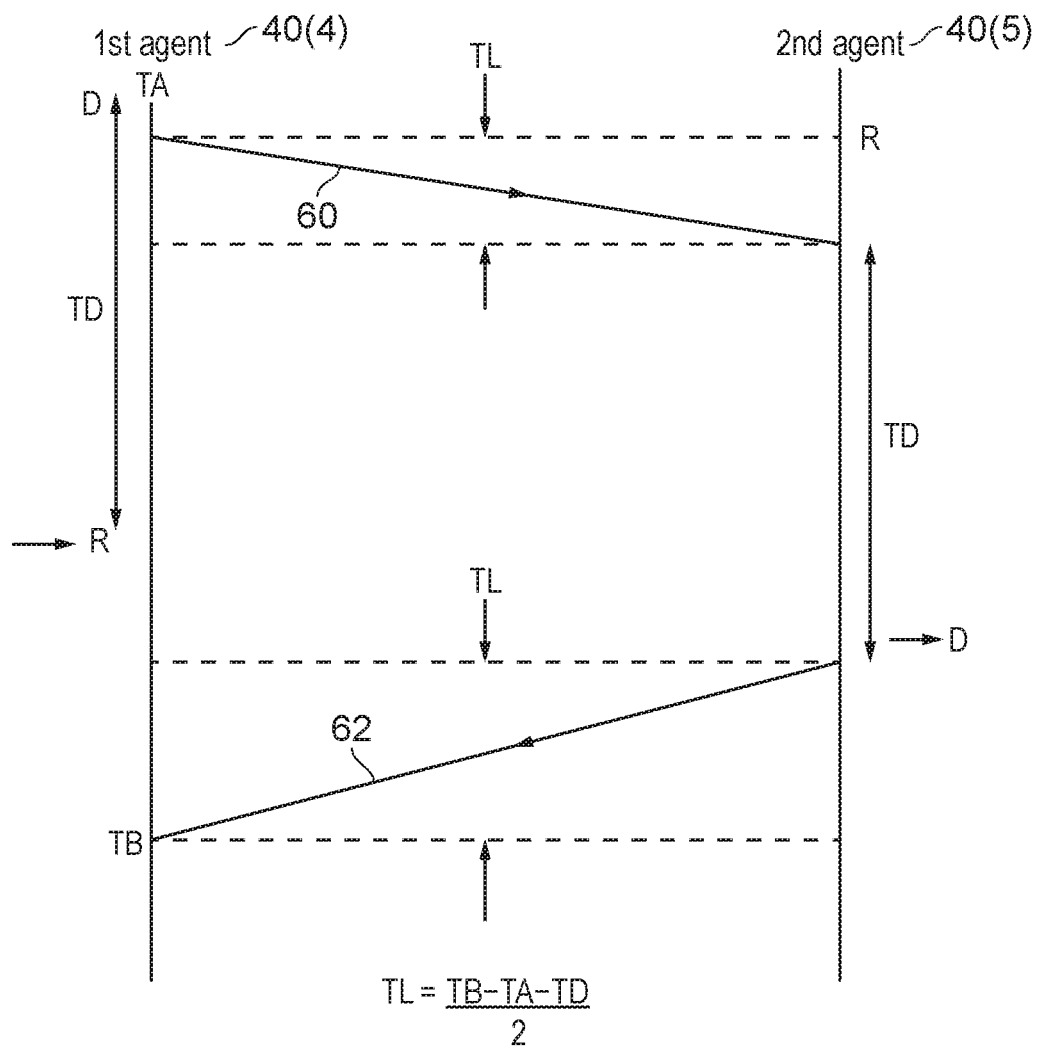
FIG. 4B shows a second example of measuring the signal propagation latency.

FIGS. 4A and 4B show two examples of techniques for determining the signal propagation latency at step 50. For ease of explanation these examples assume that the first SoC's time control agent 40(4) initiates the latency measurement. Clearly, the latency measurement could also be initiated by the second SoC's time control agent 40(5). As shown in FIG. 4A, the first time control agent 40(4) transmits a latency determining signal 60 to the second SoC 5 over the time control signal path 42. The first time control agent 40(4) also records the transmission time TA of the latency determining signal 60 using the first local time count. When the second time control agent 40(5) detects the latency determining signal 60, it immediately returns a response 62 on the other wire of the bidirectional time control signal path 42. When the response is detected by the first time control agent 40(4), the first time control agent 40(4) records the arrival time TB of the response using the first local time count generated by the time count generator 30(4) on the first SoC 4. The signal propagation latency on the two wires 44, 46 of the time control path signal 42 is expected to be approximately equal as the wires follow corresponding routes across the PCB, and so the signal propagation latency TL associated with a signal passing in one direction can be calculated as half the difference between the reception and arrival times, i.e. (TB–TA)/2. The signal propagation latency TL can then be stored in a register within the first time control agent 40(4) for future reference, or could be transmitted to the second time control agent 40(5), or stored elsewhere (e.g. in memory 12).

FIG. 4B shows an alternative technique for measuring the signal propagation latency which can be used in cases when the time control signal path 42 comprises a single wire shared by both agents for transmission and reception. At any one time, one of the time control agents 40(4) 40(5) is in a mode for driving the signal path and the other is in a mode for receiving signals asserted on the signal path. This means it is not possible for the second time control agent 40(5) to instantaneously issue a response as soon as it detects the signal transmitted from the first time control agent 40(4), as the first time control agent 40(4) is still driving the signal path. Instead, the first and second time control agents 40(4), 40(5) can agree on a predetermined delay period TD between transmission and reception. The delay TD can be set to a value which is expected to be several times greater than the expected transmission latency TL of a signal on a signal control path.

The first time control agent 40(4) transmits the latency determining signal 60 on the time control signal path 42 and records the transmission time TA using its first local time count 30(4). The first time control agent 40(4) waits for the predetermined delay time TD, and switches to receiving mode once that delay period has expired to start listening for the response 62 sent by the second time control agent 40(5).

On the other hand, the second time control agent 40(5) initially is in the receiving mode, and when the latency determining signal 60 is detected by the second time control agent then it starts to count time until the predetermined delay period TD has expired. Although the time counts of the first and second SoCs 40(4), 40(5) may not be synchronised they may still count time at the same rate (for example they may be controlled by a common clock signal). When the predetermined delay TD expires, the second time control agent 40(5) switches to driving mode, and transmits the response 62 to the latency determining signal 60 to the first time control agent 40(4). On receipt of the response 62 the first time control agent 40(4) records the arrival time TB of the response 62 using the first local time count generated by local time generator 30(4). The first time control agent 40(4) can then calculate the signal propagation delay TL according to (TB–TA–TD)/2.

In some cases, the calculation of the signal propagation delay TL in FIG. 4A or 4B can be performed in software using code executed by one of the CPUs 6, instead of by the first time control agent 40(4) itself. For example, the first time control agent 40(4) may transmit the signals for measuring the latency and record the time stamps TA, TB in a register or memory, but may not actually calculate TL itself. Alternatively, at step 50 of FIG. 3 it may not be necessary to actually send any signals on the time control signal path 42, as the transmission latency TL may already have been determined previously and so in this case the latency could simply be read from a register or from memory.

Figure 5:
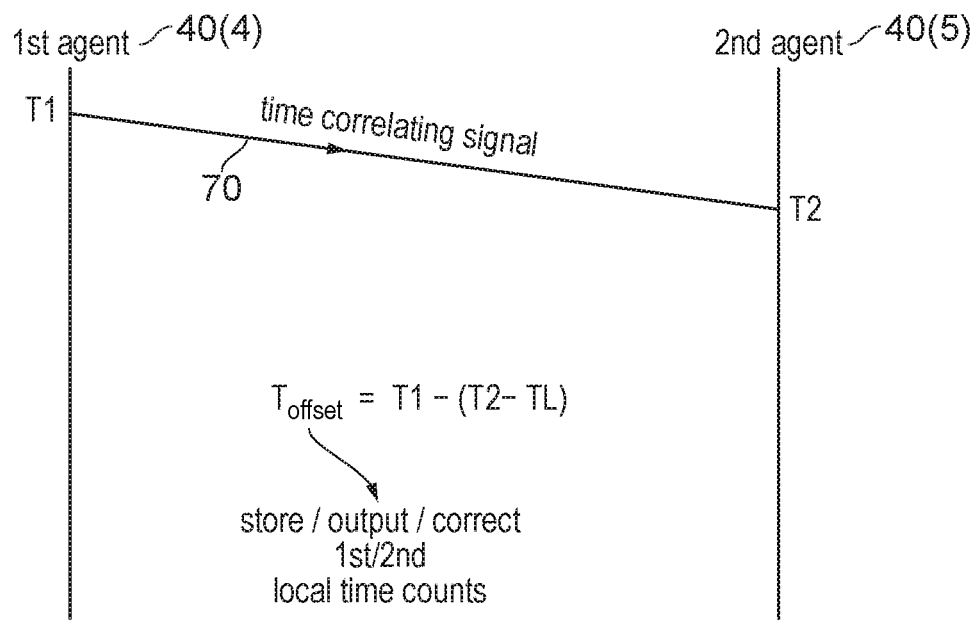
FIG. 5 shows a first example of correlating the first and second local time counts based on the determined signal propagation latency.

FIG. 5 shows a first example of a technique for correlating the first and second local time counts at step 52 of FIG. 3. The first time control agent 40(4) transmits a time correlating signal 70 on the time control signal path 42 and records the transmission time T1 of the time correlating signal 70 as measured using the first local time count generated by local time generator 30(4). On receipt of the time correlating signal 70, the second time control agent 40(5) records the arrival time T2 of the signal as measured by the second local time count 30(5). One of the first and second time control agents 40 or software executing on one of the processes 6 on one of the SoCs then calculates an offset value $T_{offset}$ based on the measured transmission and arrival times T1, T2 and the previously determined signal propagation latency TL. For example $T_{offset}$ can be calculated according to the difference between T1 and (T2–TL). The determined offset value can be stored to memory or to a register for reference when controlling any process which relies on a common view of time. For example software scheduling the tasks on the respective processors 6 can refer to the offset value in order to adjust scheduling times. Also, the offset value could be output via the debug port 34 for example to inform an external debugger of the offset which would need to be added or subtracted from times measured on one of the SoCs in order to align the time counts on one SoC with the time as counted by the other SoC.

Figure 6:
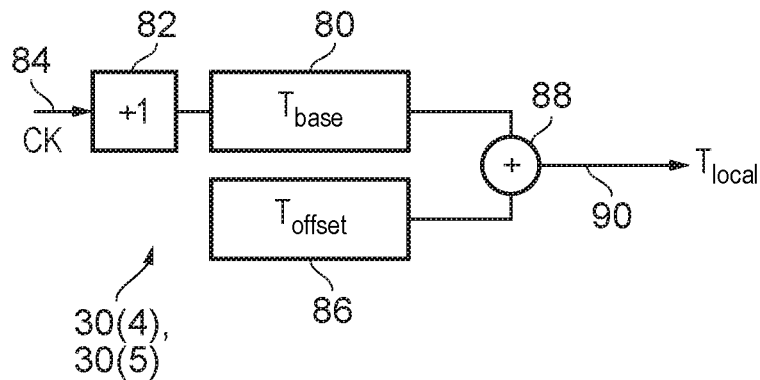
FIG. 6 shows an example of time count generating circuitry for correcting a local time count based on an offset determined in the correlation of the first and second local time counts.

Also, as shown in FIG. 6, one or both of the local time counts generators 30 on the respective SoCs can include time generating circuitry which considers the measured offset value when generating the local time count for that SoC. For example, the time generating circuit 30 may include a base time count register 80 and circuitry 82 to increment the base time count register once in response to each cycle of a clock signal 84. A second register 86 may also be provided to store the offset value $T_{offset}$ which was determined during the correlating of FIG. 5. An adder 88 adds the values in the base time stamp register 80 and the offset register 86 to generate the local time count 90 to be routed to components of the corresponding SoC 4, 5. Hence, when a correlation event is triggered and the time correlating signal 70 is sent as shown in FIG. 5 in order to measure the offset, the contents of the offset register 86 in one of the time count generators 30 on the respective SoCs can be updated based on the new offset measured so as to adapt the local time value 90 for alignment with the other SoC. By including hardware to align the time counts in this way, it is not necessary for software processes or for external debuggers to be aware of the offset being applied. Software or debuggers can simply use the local time count values 90 output by the respective time count generators 30 on the two SoCs and assume that they are aligned.

Note that when updating the offset register 86 following a correlation event, if the new offset is computed between T1 and T2 where the offset register to be updated has been applied to the time used to compute the time offset, then the new offset register value updates the offset register by adding or subtracting the newly computed offset to/from the current offset register contents. If the new offset is computed between T1 and T2 without the offset register to be updated being applied to the time used to compute the time offset, then the new offset register value is simply the computed offset. Also, while the adjustment to the offset could be applied to either of the first and second local time counts, it may be preferable to adjust one of the local time counts which has the lowest current time value to move it forward to match the time count on the other SoC. This prevents time being seen to run backwards. Hence, if the first local time count is ahead of the second local time count, then the second local time count is corrected by updating the offset value 86 in the second SoC's local time generator 30(5). If the first time count is lagging behind the second time count, then the first SoC's local time generator 30(4) would be updated instead. Either way the local time counts on both SoCs can be aligned.

Figure 7:
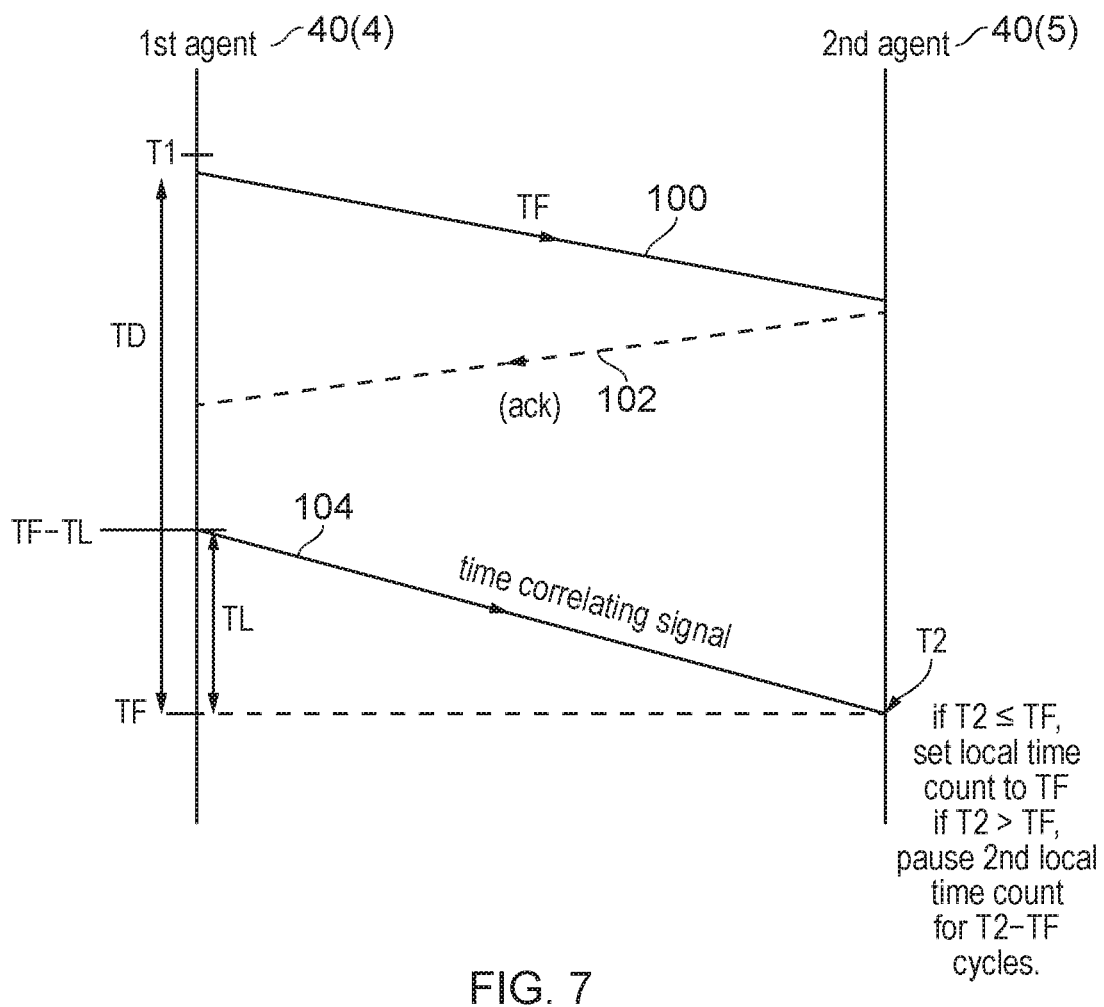
FIG. 7 shows a second example of correlating the first and second local time counts in dependence on the signal propagation latency.

FIG. 7 shows an alternative way of correlating the local time counts at step 52 of FIG. 3. In this approach, rather than measuring the current time counts on both SoCs 4,5 and adapting one of the time counts based on the difference and the signal propagation latency, in FIG. 7 the first time control agent 40(4) acts as a primary agent which imposes its view of time on the second time control agent 40(5). At a given time T1 on the first local time count, the first time control agent 40(4) transmits an indication of a predetermined future time TF to the second time control agent 40(5) via the high level communications network 22. The latency associated with the transmission of the future time TF may be variable and non-deterministic. Optionally, when the future time TF is received, the second time control agent 40(5) may transmit an acknowledgement 102 to the first time control agent 40(4). The acknowledgement 102 may be transmitted via the communications network 22. The acknowledgement 102 is not essential. The future time TF is determined to be some predetermined delay TD in advance of T1, with TD being large enough that it is expected that there will be sufficient time for transmitting the future time TF to the second agent via the communications network 22 and for subsequently transmitting a signal on the time control signal path 42 as well.

When the first local time count reaches a value TF−TL which corresponds to the difference between the future time count TF and the previously determined signal propagation latency TL, a time correlating signal 104 is transmitted on the time control signal path 42 from the first time control agent 40(4) to the second time control agent 40(5). Due to the timing at which the time correlating signal 104 is transmitted, it is expected that at the time when the time correlating signal 104 is received by the second time control agent 40(5), the first local time count will be equal to the predetermined future time TF. On receiving the time correlating signal 104, the second time control agent 40(5) checks whether the current value T2 of the second local time count is greater than the future time TF. If T2≤TF then the second time control agent 40(5) sets the second local time count equal to TF, and this is expected to the align the first and second local time count to one another. If T2>TF, i.e. the second local time count is already ahead of the predetermined future time, then setting the second local time count to TF would cause time to be seen to run backwards which would be undesirable. Hence, if T2>TF, then instead the second local time generator 30(5) is paused for T2−TF cycles and then restarted, at which point the first local time count will have reached T2 and so now the first and second local time counts are aligned. In embodiments where the correlation is only performed at a time of resetting or powering up the second integrated circuit, then it may be assumed that T2 cannot be greater than TF as the second time generator may not have started counting yet, and so in this case it may not be necessary to check whether T2 is greater than TF, and instead the second local time count can simply be set to equal TF on receipt of the time correlating signal (in the same way as the T2≤TF case described above).

With the approach shown in FIG. 7, there is a possibility that if current data load conditions on the data communications network 22 are high, then the future time TF may not be received over the communications network 22 before the time T2 at which the second agent receives the time correlating signal 104. This could sometimes result in an incorrect setting of the second local time count value. To address this, the correlating process may be restarted when it is detected that there is a risk of the future time TF not being received by the second time control agent 40(5) in time. In embodiments which use an acknowledgement message 102, one approach for triggering the restart may be that the first agent 40(4) restarts the correlating process if the first local time count value reaches the predetermined value TF−TL at which the time correlating signal 104 is to be transmitted, before the acknowledgement 102 from the second time control agent 40(5) has been detected. Alternatively, the first time control agent 40(4) could transmit the time correlating signal 104 regardless of whether any acknowledgement has been received, and instead the second time control agent 40(5) could request restarting of the correlation process if the time correlating signal 104 is received before the future time 100 has been detected by the second time control agent 40(5). Either way, this can deal with cases where the future time count arrives too late.

The transmission of the future time 100 as shown in FIG. 7 is not always necessary. For example, after a reset the future time could be implicit, as the time TF may simply be assumed to be some predetermined number of cycles after the reset was triggered, and this may already be known by the second time control agent 40(5). For example, the first time control agent 40(4) could simply transmit the time correlating signal 104 a certain number of cycles TX−TL after reset, and the second time control agent 40(5) may, on receiving the time correlating signal 104, set the second local time count to TX, with TX being hardwired, read from a register, or previously agreed.

Figure 8:
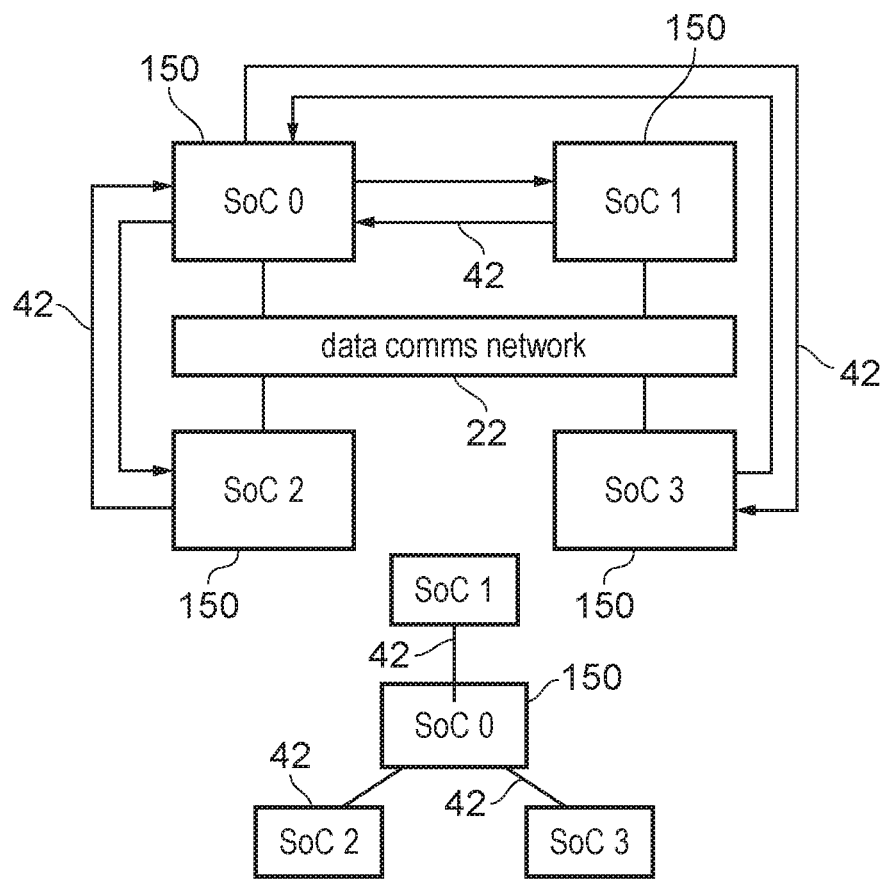
FIG. 8 shows an example of a system comprising more than two integrated circuits in which time control signal paths connect the respective integrated circuits in a star topology.
Figure 9:
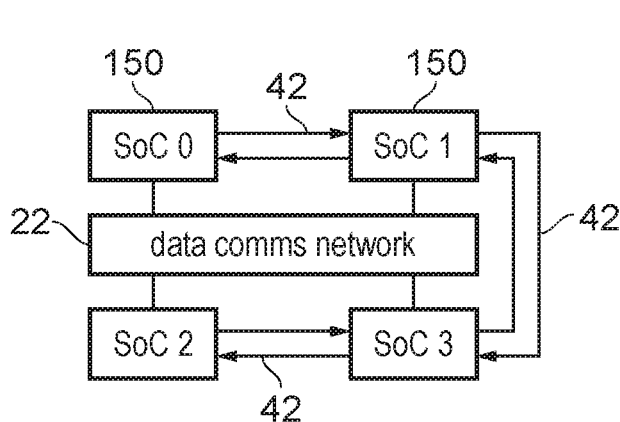
FIG. 9 shows an alternative example of connecting the different integrated circuits in a line topology.
Figure 10:
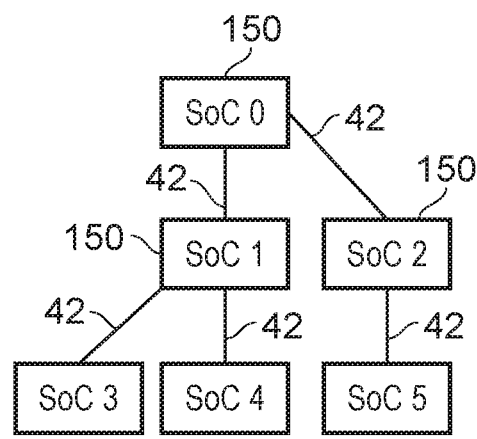
FIG. 10 shows another example of connecting the integrated circuits in a tree topology.

Hence, the techniques discussed above provide a way of characterising chip-to-chip time stamp skew and correlating or aligning the different local time counts across the system, without needing to explore the time stamps between the chips explicitly over a high level communications network, which would have issues as the chip-to-chip data link may have high latency and large variations in the latency. It also provides a technique which scales better to systems with multiple SoCs in the same circuit board. As shown in FIGS. 8 to 10 the method can be scaled up to cover more than two SoCs on the same system.

As shown in FIGS. 8 to 10, it is not necessary to provide time control signal paths 42 linking every possible pair of SoCs. Instead, it is sufficient for the time control signal paths 42 to be provided so that any given pair of SoCs can be linked via time control signal paths 42 either directly or indirectly via another SoC 150. Different topologies are possible for organising this. For example, FIG. 8 shows a star topology, where a primary SoC, SoC 0 in this example, is connected to each of the other SoCs via a time control signal path 42, but there are no time control signal paths 42 between the secondary SoCs. Hence, each SoC can have its local time stamp aligned with that of the primary SoC 0. This approach can be particularly useful for the example of FIG. 7 where a primary SoC imposes its view of time on the other SoCs.

Alternatively, as shown in FIG. 9, a line topology could be used where each SoC is connected to an adjacent SoC but there is no central SoC which manages all the time stamp alignment processes. In this example, SoC 0 can align its time stamp with SoC 1, SoC 1 can align its time stamp with SoC 3, and SoC 3 can align its time stamp with SoC 2. FIG. 10 shows another example of a tree topology where a root SoC (SoC 0) is connected by time control signal paths to two or more branch SoCs (SoCs 1 and 2), which are each connected to one or more further SoCs (SoCs 3 to 5), and so on. The particular sequence in which three or more SoCs' local time counts are correlated may be selected depending on the topology used for the time control signal paths 42.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for correlating a first local time count of a first integrated circuit and a second local time count of a second integrated circuit, the first integrated circuit and the second integrated circuit configured to communicate via a communication network within a data processing apparatus; the method comprising:
    determining a signal propagation latency associated with propagation of a latency determining signal between the first integrated circuit and the second integrated circuit on a dedicated time control signal path separate from the communication network used for general communication between the first integrated circuit and the second integrated circuit, wherein the communication network is capable of transmitting signals with a larger number of bits than signals transmitted on the dedicated time control signal path, and the dedicated time control signal path has a bit width incapable of transmitting the first local time count or the second local time count; and
    correlating the first local time count and the second local time count in dependence on the signal propagation latency and at least one of a transmission time and a reception time of a time correlating signal transmitted between the first integrated circuit and the second integrated circuit on the dedicated time control signal path.

2. The method of claim 1, wherein the correlating comprises aligning the first local time count and the second local time count.

3. The method of claim 1, wherein the correlating comprises storing or outputting an offset value representing an offset between the first local time count and the second local time count.

4. The method of claim 3, wherein at least one of the first integrated circuit and the second integrated circuit comprises a time generating circuit to generate one of the first local time count and the second local time count in dependence on said offset value.

5. The method of claim 3, wherein software executed by processing circuitry on one of the first integrated circuit and the second integrated circuit uses the offset value to correlate or schedule events in the first integrated circuit and the second integrated circuit.

6. The method of claim 1, wherein the signal propagation latency is determined by reading the signal propagation latency from a storage element.

7. The method of claim 1, wherein the signal propagation latency is determined in dependence on a round trip time of the latency determining signal and a response to the latency determining signal transmitted between the first integrated circuit and the second integrated circuit.

8. The method of claim 1, wherein the time correlating signal is transmitted from the first integrated circuit to the second integrated circuit, and the correlating comprises:
    recording a value T1 of said first local time count when the time correlating signal is transmitted at the first integrated circuit;
    recording a value T2 of said second local time count when the time correlating signal is received at the second integrated circuit; and
    determining an offset value for correlating the first local time count and the second local time count in dependence on T1, T2 and the signal propagation latency.

9. The method of claim 8, wherein the offset value comprises a value corresponding to a difference between T1 and (T2−TL), where TL is the signal propagation latency.

10. The method of claim 8, wherein the correlating comprises adjusting one of the first local time count and the second local time count in dependence on the offset value.

11. The method of claim 10, wherein the adjusting is applied to at least the one of the first local time count and the second local time count having the lowest time count value.

12. The method of claim 1, wherein the correlating comprises:
    transmitting the time correlating signal from the first integrated circuit to the second integrated circuit when the first local time count reaches a predetermined count value corresponding to a difference between a future count value and the signal propagation latency; and
    setting the second local time count to the future count value in response to receipt of the time correlating signal at the second integrated circuit, or pausing the second local time count for a number of cycles corresponding to a difference between a second local time count value corresponding to a reception time of the time correlating signal and the future count value.

13. The method of claim 12, comprising the first integrated circuit transmitting an indication of the future count value to the second integrated circuit before transmitting the time correlating signal.

14. The method of claim 13, comprising restarting the correlating when:
    the first local count value reaches the predetermined count value before the second integrated circuit is detected by the first integrated circuit as having acknowledged receipt of the future time count value; or
    the time correlating signal is received by the second integrated circuit before the future time count value has been received by the second integrated circuit.

15. The method of claim 1, wherein at least one of the first integrated circuit and the second integrated circuit comprises coherency managing circuitry to manage coherency between data accessed by the first integrated circuit and data accessed by the second integrated circuit.

16. The method of claim 1, wherein at least one of the first integrated circuit and the second integrated circuit comprises debug circuitry to capture or output information tracking timing of events occurring in the first integrated circuit and the second integrated circuit.

17. The method of claim 1, wherein the data processing apparatus comprises three or more integrated circuits including the first integrated circuit and the second integrated circuit, and the three or more integrated circuits are connected by respective dedicated time control signal paths in a topology connecting any two of the integrated circuits directly by one of the time control signal paths or indirectly by time control signal paths passing via at least one other integrated circuit.

18. The method of claim 1, wherein the dedicated time control signal path comprises a bidirectional communication path with a deterministic signal propagation delay.

19. The method of claim 1, wherein the first integrated circuit comprises a first System-on-Chip (SoC) and the second integrated circuit comprises a second SoC.

20. A data processing apparatus comprising:
- a first integrated circuit to maintain a first local time count;
- a second integrated circuit to maintain a second local time count;
- a communication network to provide communication between the plurality of integrated circuits; and
- a dedicated time control signal path between the first integrated circuit and the second integrated circuit separate from the communication network used for general communication between the first integrated circuit and the second integrated circuit, wherein the communication network is capable of transmitting signals with a larger number of bits than signals transmitted on the dedicated time control signal path, and the dedicated time control signal path has a bit width incapable of transmitting the first local time count or the second local time count;

wherein at least one of the first integrated circuit and the second integrated circuit comprises a time control agent to determine a signal propagation latency associated with propagation of a latency determining signal between the first integrated circuit and the second integrated circuit on the dedicated time control signal path, and to correlate the first local time count and the second local time count in dependence on the signal propagation latency and at least one of a transmission time and a reception time of a time correlating signal transmitted between the first integrated circuit and the second integrated circuit on the dedicated time control signal path.

* * * * *